(12) United States Patent
Mercat et al.

(10) Patent No.: US 6,216,344 B1
(45) Date of Patent: Apr. 17, 2001

(54) METHOD FOR BORING A SPOKE RIM AND FOR PROVIDING AN INSERT FOR THE BORED RIM

(75) Inventors: Jean-Pierre Mercat, Chatillan; Alban Minville, Romaneche Thorens, both of (FR)

(73) Assignee: Mavic S.A., Saint Trivier sur Moignans (FR)

(*) Notice: Subject to any disclaimer, the term of this patent is extended or adjusted under 35 U.S.C. 154(b) by 0 days.

(21) Appl. No.: 09/277,942

(22) Filed: Mar. 29, 1999

Related U.S. Application Data

(63) Continuation-in-part of application No. 08/893,761, filed on Jul. 11, 1997, which is a continuation-in-part of application No. 08/893,700, filed on Jul. 4, 1997, now abandoned.

(30) Foreign Application Priority Data

Jul. 12, 1996  (FR) .................................................. 96 09047
Jul. 12, 1996  (FR) .................................................. 96 09048

(51) Int. Cl.[7] .............................. B21K 1/38; B21D 53/26
(52) U.S. Cl. ................................. 29/894.351; 29/894.35; 29/894.33
(58) Field of Search ................ 29/894.35, 894.351, 29/894.352, 894.33, 894.333; 301/58, 67, 68, 69, 70, 71, 95, 96, 97; 72/71

(56) References Cited

U.S. PATENT DOCUMENTS

| | | | |
|---|---|---|---|
| 183,647 | * 10/1876 | Danford | 301/95 |
| 399,453 | * 3/1889 | Warwick | 301/95 |
| 804,617 | 11/1905 | Newton . | |
| 1,286,065 | 11/1918 | Murray . | |
| 1,316,605 | * 9/1919 | Wagenhorst | 301/95 |
| 1,451,911 | * 4/1923 | Johnson | 301/95 |
| 1,469,769 | * 10/1923 | Booth | 301/95 |
| 1,584,576 | * 5/1926 | Wagenhorst | 301/95 |
| 1,649,678 | * 11/1927 | Freivogel | 301/95 |
| 1,906,953 | * 5/1933 | Enghauser | 29/890.08 |
| 2,937,905 | * 5/1960 | Altenburger . | |

(List continued on next page.)

FOREIGN PATENT DOCUMENTS

| | | |
|---|---|---|
| 4143380 | 5/1993 | (DE) . |
| 42 24 131A1 | * 1/1994 | (DE) . |
| 130449 | 9/1985 | (EP) . |
| 579525 | 1/1994 | (EP) . |
| 0 714 791A1 | * 10/1995 | (EP) . |
| 714791 | 6/1996 | (EP) . |
| 714792 | 6/1996 | (EP) . |
| 10296764 | 6/1953 | (FR) . |
| 2707559 | 1/1995 | (FR) . |
| 2722735 | 1/1996 | (FR) . |
| 61-081801 | 4/1986 | (JP) . |
| 93/09963 | 5/1993 | (WO) . |
| 96/11075 | 4/1996 | (WO) . |

OTHER PUBLICATIONS

Patent Abstracts of Japan, vol. 010, No. 253 (M–512), published on Aug. 29, 1986, of Japanese Patent Publication No. 61–081801 (Honda Motor Co., Ltd.), published on Apr. 25, 1986.

*Primary Examiner*—S. Thomas Hughes
*Assistant Examiner*—Marc Jimenez
(74) *Attorney, Agent, or Firm*—Greenblum & Bernstein, P.L.C.

(57) ABSTRACT

The invention relates to the method for manufacturing a rim for a spoke wheel, especially a cycle rim. At least one bridge of the rim is bored with a plurality of through holes with a flow drilling bit operating in the direction of the other bridge, so as to create a backflow chimney at the level of each opening of the upper bridge, whose length is greater than the thickness of the bridge. The rim is equipped with inserts provided to receive the spoke nipples. The inserts are either embedded in the chimney openings, or screwed.

23 Claims, 9 Drawing Sheets

U.S. PATENT DOCUMENTS

| | | | |
|---|---|---|---|
| 3,008,770 | * 11/1961 | Mueller | 301/58 |
| 4,175,413 | * 11/1979 | Van Geffen | 72/71 |
| 4,185,486 | * 1/1980 | Van Geffen | 72/71 |
| 4,428,214 | * 1/1984 | Head et al. | 72/71 |
| 4,583,787 | 4/1986 | Michelotti . | |
| 5,110,190 | * 5/1992 | Johnson | 301/58 |
| 5,651,591 | 7/1997 | Mercat et al. . | |
| 5,653,510 | * 8/1997 | Osborne | 301/95 |
| 5,829,299 | * 11/1998 | Wessels | 29/894.35 |
| 5,984,138 | * 11/1999 | Olson | 220/801 |

\* cited by examiner

METHOD FOR BORING A SPOKE RIM AND FOR PROVIDING AN INSERT FOR THE BORED RIM

CROSS-REFERENCE TO RELATED APPLICATIONS

The present application is a continuation-in-part of U.S. application Ser. No. 08/893,761, filed Jul. 11, 1997, issue Nov. 21, 2000 in the names of Jean-Pierre Mercat and Alban Minville, entitled "METHOD FOR BORING A SPOKE RIM, RIM BORED ACCORDING TO THE METHOD, INSERT ADAPTED TO EQUIP THE RIM, AND WHEEL ESPECIALLY CYCLE RIM". The present application is also a continuation-in-part of U.S. application Ser. No. 08/893,700, filed Jul. 11, 1997, abnd. in the names of Jean-Pierre Mercat and Alban Minville, entitled "METHOD FOR BORING A SPOKE RIM, RIM BORED ACCORDING TO THE METHOD, INSERT ADAPTED TO EQUIP THE RIM, AND WHEEL ESPECIALLY CYCLE WHEEL". The disclosures of both the above-listed parent applications are expressly incorporated by reference, in their entireties, herein. The present application does not include substantive disclosure not present in the parent applications, and is thus a continuation-in-part only because no single one of the parent applications alone includes all of the presently disclosed material.

BACKGROUND OF THE INVENTION

1. Field of the Invention

The present invention relates to a method for boring a bicycle wheel spoke rim. The invention also relates to a bicycle rim obtained using the method.

2. Background and Material Information

In a known manner, a wheel, especially a bicycle wheel, includes a central hub connected to a circular rim by two rows of spokes. The rim is formed of two circular bridges connected by two lateral flanks so as to form a box. The lateral flanks are extended outwardly by two wings, so as to form, with the upper bridge, an annular channel provided to receive a tubular. For certain rims that are provided to receive a tube, the channel is a mere groove formed by a caving-in of the upper bridge. The spokes are connected to the rim by nipples screwed at the end of the spokes. These nipples further make it possible to adjust the tension of the spokes.

To receive the spoke nipples in a conventional manner, the two bridges of the rim are bored with openings spread along the circumference of the rim. The openings of the lower bridge are provided to serve as a seat for the nipple heads. The openings of the upper bridge, with a greater diameter, are provided to enable the positioning of the spoke nipple from the outside.

To improve the conditions in which the nipple head takes support against the rim, and the distribution, in the rim, of the stresses induced by the tension of the spokes, it is known to equip the rims with eyelets that extend through the openings of the lower bridge. These eyelets are assembled by crimping to the periphery of the opening of the lower bridge. They further have a cup-shaped eyelet body whose lower portion rests on the lower bridge, and the upper portion has an edge that rests against the upper bridge. The base of these eyelets is bored for the passage of the nipple body. These eyelets are advantageous because they establish mechanical linkages between the two bridges, which reinforces the structure of the rim and its bending strength.

A monoblock eyelet is described in the patent application Ser. No. EP 130 449. These eyelets also exist in the form of two distinct elements assembled at the level of the crimping.

However, for such rims, the openings of the bridges constitute local weakening zones which weaken each of the two bridges. In addition, these openings must have a relatively large size. The openings of the lower bridge must indeed have a diameter that is sufficient to allow for the passage of the nipple body and its free rotation. The openings of the upper bridge must enable the passage of the nipple head upon which the fastening of the spoke to the rim, as well as the adjustment tools are dependent.

Another problem of these rims is that when adjusting the tension of the spokes, the spoke itself is torsionally biased and twist over itself before a relative movement occurs at the level of the threads for linking with the nipple. As a result, the tension adjustment of the spokes is relatively inaccurate, and the spokes do not work properly.

Another problem of these rims comes from the manufacturing of the eyelets. Indeed, if one wishes to equip the rim with cup-shaped double eyelets, the distance between the two bridges of the rim is directly related to the height of the cup of the eyelet. Since the eyelet is conventionally made of stainless steel by stamping, the maximum height of an eyelet is thereby limited, which imposes dimensional constants for the rim.

However, a rim having threaded openings is known from the published patent application Ser. No. WO 93/09963. The threaded end of the spokes is connected to this rim by means of a nipple that is threaded internally and eternally with a different pitch. This rim further has an unpunched upper bridge, except for the mounting of a valve, if necessary, which makes the rim airtight, and therefore appropriate for the mounting of a tubeless type of tire.

However, the lower bridge that is bored and threaded must be reinforced in its thickness to withstand the stresses, which results in an undesired increase in the weight and inertia of the rim. The mode for mounting the spokes does not solve the spoke twisting problem either.

SUMMARY OF THE INVENTION

An object of the invention is to propose a method for boring a rim which makes it possible to obtain a rim having improved mechanical characteristics, without any significant weight increase.

Another object of the invention is to propose a rim bored with openings which has an improved resistance to fracture.

Another object of the invention is to propose a rim in which the distance between the two bridges is freed from the height limit constraint for the cups of the eyelets.

Another object of the invention is to propose a wheel equipped with spokes whose tractional working conditions are improved.

Another object of the invention is to propose a method for boring a rim and a rim obtained by the method which improves the mechanical strength of the rim.

Another object of the invention is to propose a boring method and a rim which facilitate the positioning of the inserts or of the eyelets.

According to the invention, the method for making a rim bored with openings provided to receive spokes for linkage with a hub, the rim having a box with an upper bridge and a lower bridge, includes the feature that at least one bridge is bored with a through hole by means of flow drilling bit operating in the direction of the upper bridge.

The method, according to another embodiment of the invention, for making a rim bored with openings provided to receive spokes for linkage with a hub, the rim having a box with an upper bridge and a lower bridge, is characterized in that at least the upper bridge is bored with a plurality of through holes, drilled by means of a flow drilling bit operating in the direction of the lower bridge, so as to create a backflow chimney at the level of each opening of the upper bridge, whose length is greater than the thickness of the bridge.

The rim obtained using the method includes the feature that at least one of the bridges has a plurality of through holes demarcated by a backflow chimney whose height is greater than the thickness of the bridge.

Other objects and advantages of the invention will become apparent along the description that follows.

BRIEF DESCRIPTION OF DRAWINGS

The invention will be better understood along the following description, with reference to the annexed drawings that are an integral part thereof, and in which.

DETAILED DESCRIPTION OF THE PREFERRED EMBODIMENTS

Figure 1:
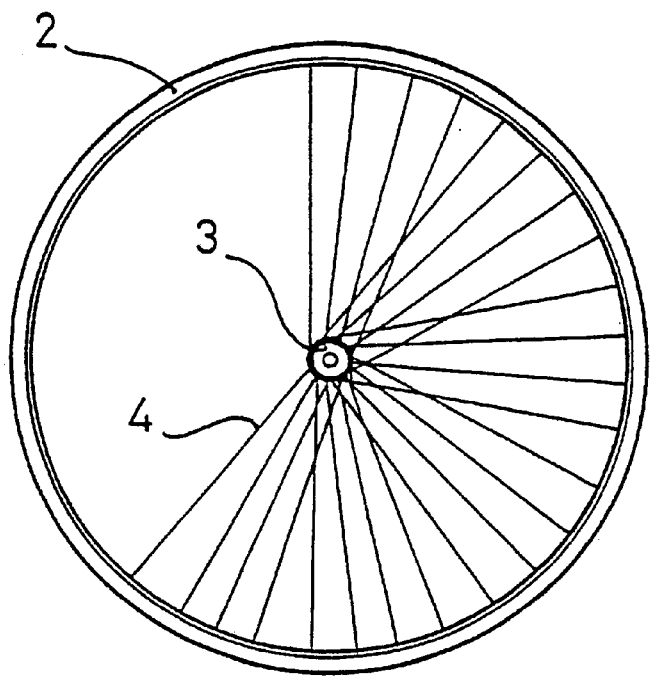
FIG. 1 a general side view of a wheel.

FIG. 1 shows a bicycle wheel which includes a circular rim 2 connected to a central hub 3 by spokes 4. Only a portion of the spokes is shown in this FIG. In a known manner, the hub has appropriate means for providing the linkage with the frame. As is visible in FIG. 2, the spokes are distributed along two symmetrical rows, each of which is fastened to an end of the hub 3.

Figure 2:
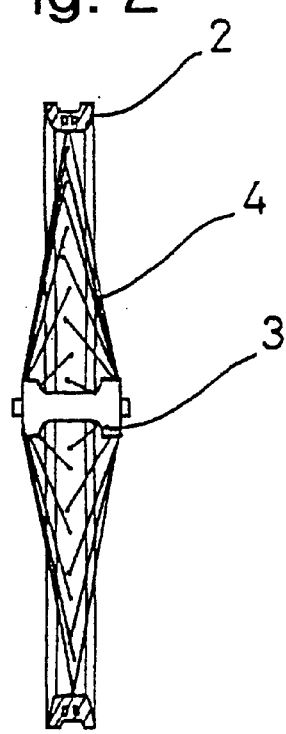
FIG. 2 is a front view of the wheel of FIG. 1.

The wheel shown in FIGS. 1 and 2 is a front wheel. In the case of a conventional rear wheel, one of the rows of spokes is offset toward the median portion of the hub, such that the hub has, on this side, a joining piece that includes the free wheel mechanism and serves as a support for the sprocket box. This is known to one with ordinary skills in the art.

Figure 3:
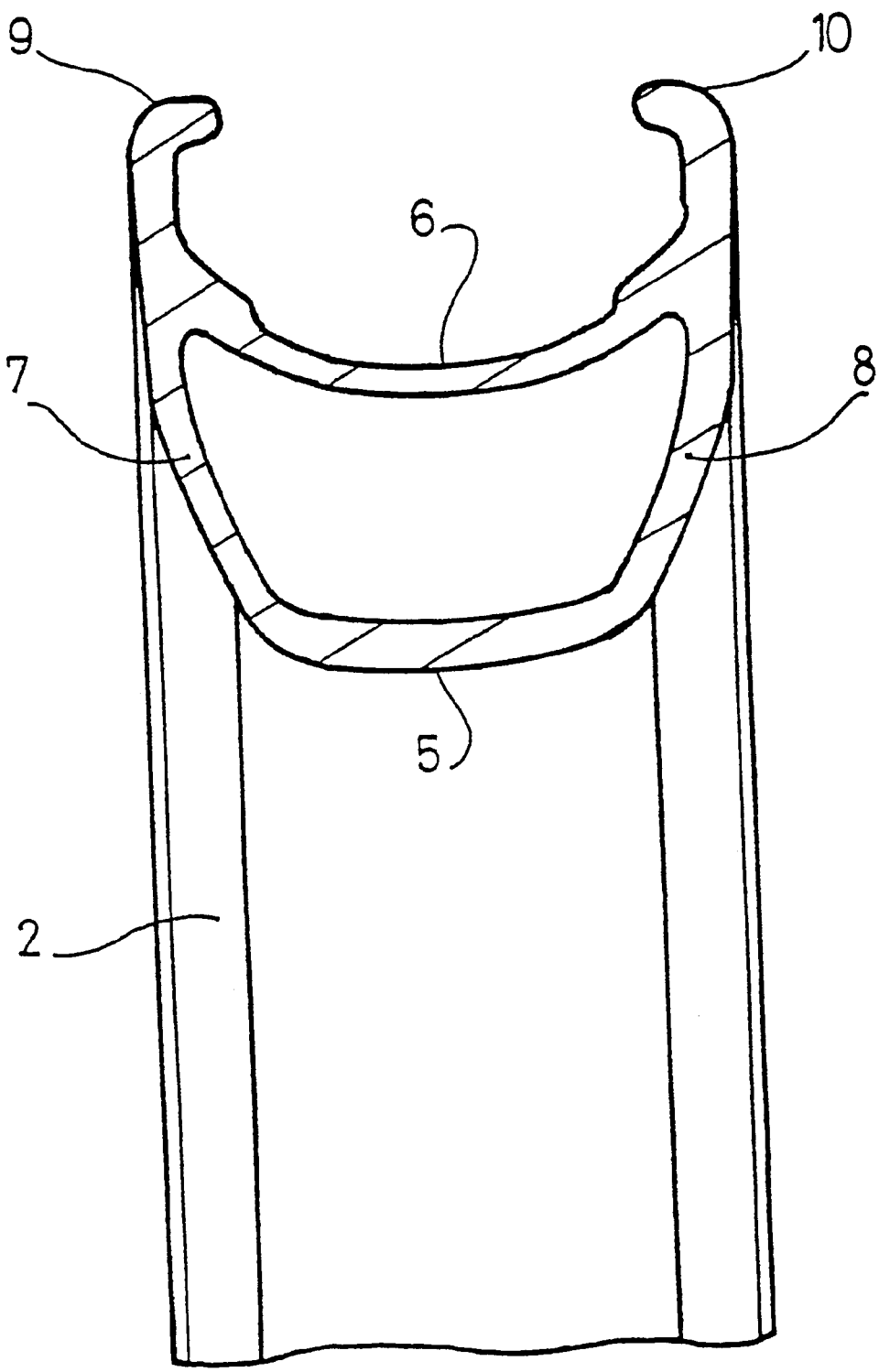
FIG. 3 is a partial front and cross sectional view, through a transverse plane of section, of a rim in the raw state.

FIG. 3, in a transverse cross section and partial view, shows the rim 2 in the raw state. This rim has, in a known manner, a box structure having a lower bridge 5 and an upper bridge 6 connected by lateral walls 7 and 8. These walls are extended beyond the upper bridge 6 by two wings 9 and 10 which form, with the bridge 6, an annular channel provided to receive a tire and a tube, if necessary.

The rim shown in the FIG. is however not limiting for the invention, neither with respect to the profile of the section, nor with respect to the mounting of a tire. The invention indeed applies to rims provided to be equipped with a tire as well as to rims provided to be equipped with a tube or any other tire tread.

In a known manner, the rim such as that shown in FIG. 3 is obtained from a shaped bar made of aluminum alloy or of any other light alloy, such bar being bent and then butt joined by means of a sleeve or by welding. In the raw state, the two bridges are unpunched continuous walls.

Figure 4:
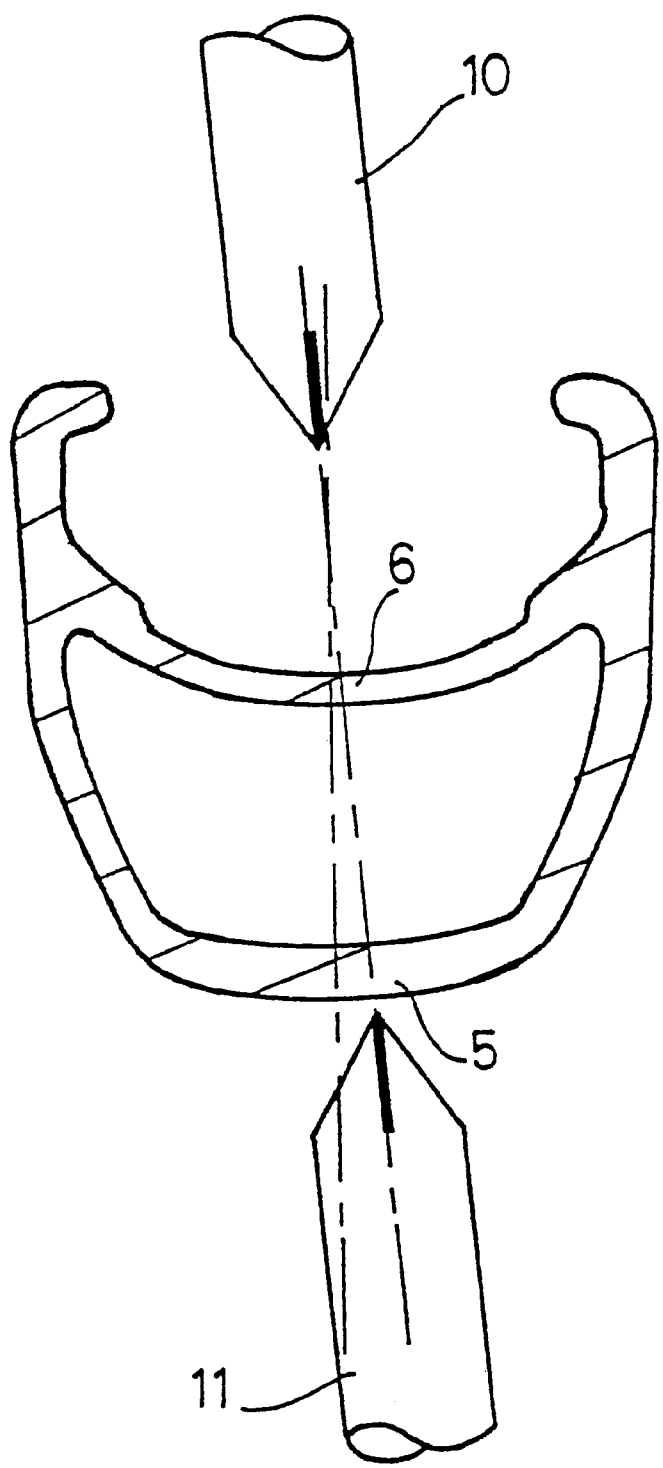
FIG. 4 illustrates the operation of boring the rim according to a first embodiment of the invention.
Figure 5:
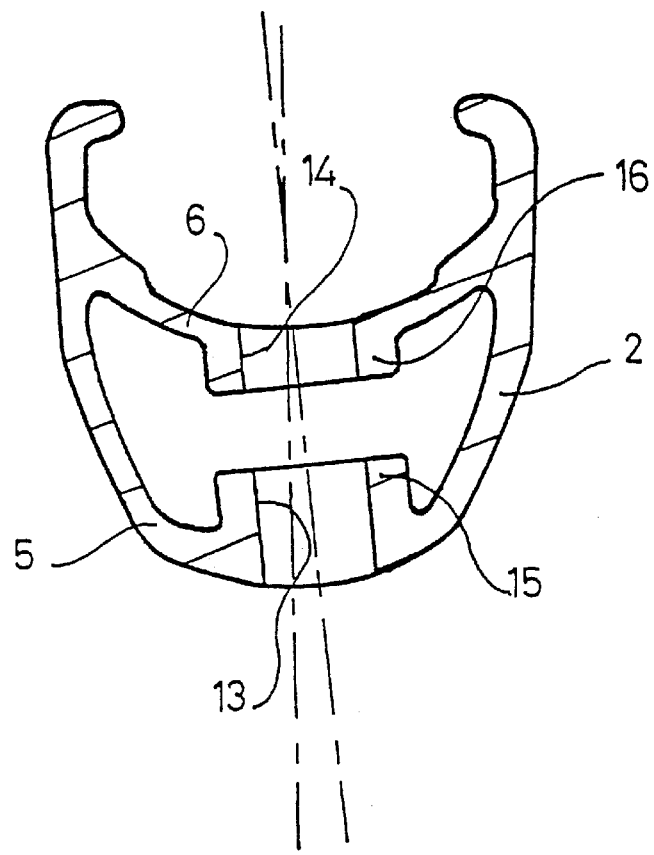
FIG. 5 shows the result of the boring operation.

FIGS. 4 and 5 illustrate the operation of boring the rim according to a first embodiment. This operation, in a known manner, consists of boring the two bridges of the rim at regular intervals, in order to enable the fastening of the spokes. It must be noted that the boring of the openings takes into account the specific orientation of each spoke, such orientation being determined by the general orientation of each row, and by the number of spokes per row.

According to the invention, the rims are bored, not by means of a conventional cutting drill, but by means of flow drilling drill bit. The flow drilling technique is known in itself. The drill bits used for such a boring have a generally cylindrical shape, with a punch-shaped tip. The tip is formed with edges, which gives it a general shape of pointed pyramid. Other tool shapes are also suitable.

Two tools 10 and 11 are used in the present case to bore the two bridges. They are coaxially mounted, and are driven in a rotational and translational movement in the direction of the rim by any appropriate means.

The flow drilling technique has the particularity of not cutting the material, but rather of pushing it in the direction of progression of the drill bit along a chimney. In the present case, the chimneys are oriented toward the interior of the box of the rim.

Flow drilling can create a burr on the side opposite the chimney. This burr is trimmed off or shaped by the drilling tool itself which has at least on trimming tooth for this purpose. The burr can also be trimmed off or shaped by a proper machining operation.

FIG. 5 shows the rim in transverse cross section at the level of a pair of openings, after drilling and removal of the drill bits. Each bridge 5, 6, has a through hole 13, 14 demarcated by a chimney 15, 16, which extends toward the interior of the box. The two chimneys are oriented in a direction toward one another, and are in alignment with one another. In the embodiment shown, the two openings 13 and 14 have the same diameter. This is not limiting, and as will be described subsequently, they can have a different diameter.

For each chimney, the height of the wall and its thickness depend on the characteristics of the material of the rim, on the initial thickness of the bridge, on the diameter of the drill bit, and on drilling parameters, rotational speed, progression speed, etc.

One was able to obtain the following results.

For a rim made of aluminum alloy 6106, a 1.5 mm bridge was bored with a drill bit having a 5.5 mm diameter. The chimney obtained had a useful length of about 5 mm, this length including the thickness of the bridge.

It must be noted here that the boring of the openings using the flow drilling technique is advantageous with respect to the mechanical strength of the rim. Indeed, the structure of the material does no longer have any sudden discontinuity as is the case for a conventional boring by cutting. Due to its peripheral wall, the chimney maintains a certain homogeneity in the structure of the bridges, such that the mechanical resistance to fracture of the rim thus bored is higher than that of a rim bored in a conventional manner.

Another advantage is that such a flow drilling does not generate any chips; in particular, there is no chip that could penetrate into the box.

Finally, the two chimneys are oriented toward the interior of the box; therefore, there is no portion projecting outwardly, especially on the side provided for the tire or the tube.

Figure 6:
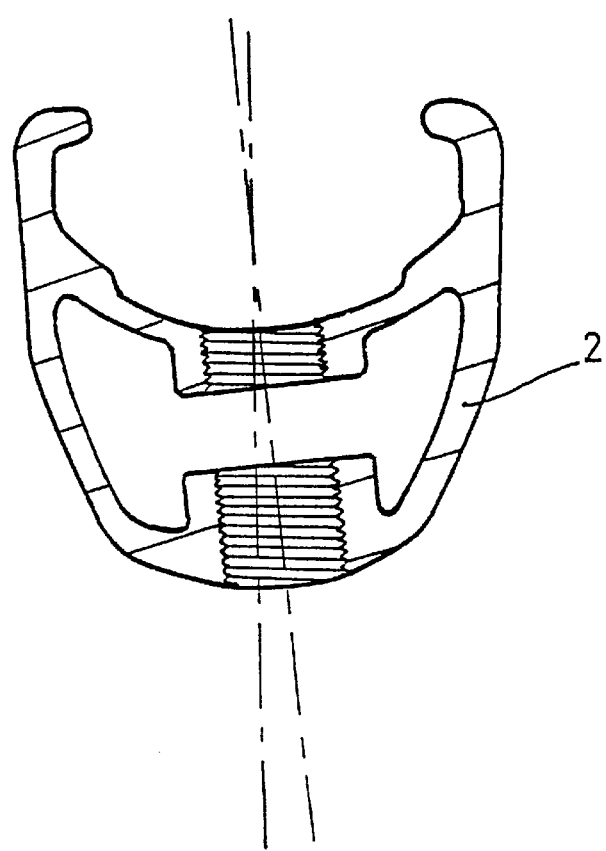
FIG. 6 illustrates the following step of threading the openings of the rim.

FIG. 6 illustrates the next manufacturing step which consist of threading the two openings 13 and 14 of the bridges. After threading, it is provided to screw a monoblock insert in the two openings, such that the two threads are made as a function of one another. If the two holes have the same diameter, the two threading operations can be carried out with a single tap in a single pass. If the openings have different diameters, a staged tap, or any other appropriate means, can be used.

Figure 7:
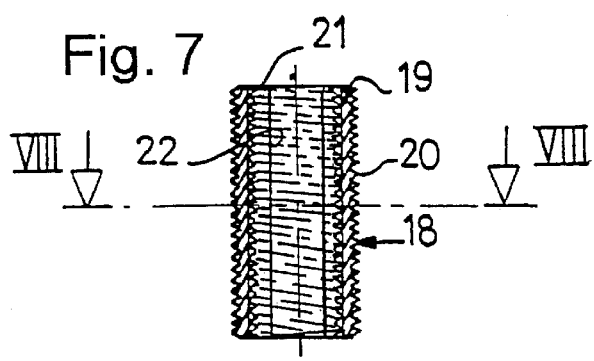
FIG. 7 shows a front and cross sectional view, through a transverse plane, of an insert provided to be screwed in the openings.
Figure 8:
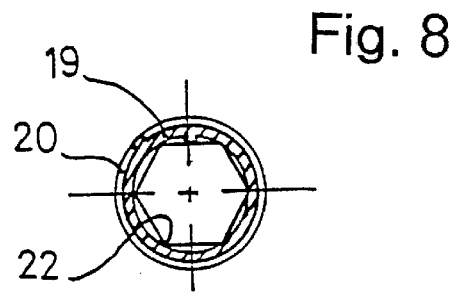
FIG. 8 is a top and cross sectional view of the insert of FIG. 7.

The insert 18 provided to be screwed in the two threaded openings is shown in FIGS. 7 and 8. It has the shape of a tube portion that is threaded at its outer wall with respect to the diameter and pitch of the openings 13 and 14. Preferably, the length of the insert is equal to, or slightly less than the distance between the upper surface of the upper bridge 6 and the lower surface of the lower bridge 5, such that once screwed in the two, openings of the bridges, the insert is totally integrated within the perimeter of a section of the rim.

The interior of the insert is also threaded to a pitch that is independent of the external pitch of the insert. In addition, the interior of the insert has, at least in its lower portion, a polygonal section, for example hexagonal, that is obtained in the thickness of the threading. Initially, this hexagonal section makes it possible to screw the insert in the openings 13 and 14 by means, for example, of an appropriate hexagonal wrench. As will appear hereinafter, the hexagonal shape also serves as an anti-rotation guide for a joining piece located at the end of the spoke. FIG. 8 shows the insert 18 in a top view, with its body 19, on the exterior of the body, a thread 20 of the external threading, and on the interior of the body, an internal thread 21 sectioned by six triangular grooves 22 that are distributed at the peaks of a hexagon, and together define a hexagonal section.

Other means can also be suited to ensure the coupling with a tool in order to carry out the screwing of the insert, for example, one or more grooves provided in the inner wall of the insert along all or part of its height, and provided to cooperate with a tool carrying one or more lugs arranged appropriately.

Likewise, the insert could have on the side of the lower bridge, i.e., toward the interior of the rim, a projecting extension, with a hexagonal external section, for example, which enables the coupling of a screwing tool. This replaces the hexagonal section within the insert. This internal hexagonal section is however preferred, because it enables a weight gain on the inserts, as well as a saving in space, and it facilitates the spoke positioning which will be described in detail subsequently.

The insert is made of any appropriate material, such as aluminum alloy, for example.

Figure 9:
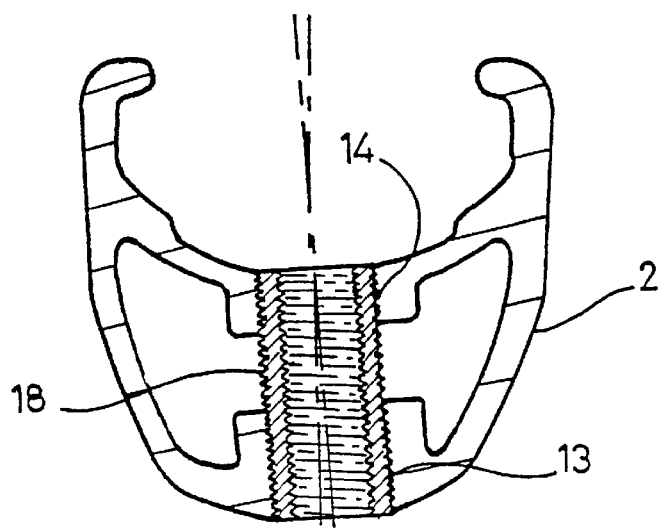
FIG. 9 shows the insert mounted in the rim.

The insert is provided to be screwed in the openings 13 and 14 of the rim, and preferably immobilized by any appropriate means, such as adhesion, for example. FIG. 9 illustrates this step of making the rim equipped with inserts.

Advantageously, the insert 18 provides a mechanical linkage between the two bridges 5 and 6, which operates both ways in a longitudinal direction defined by the insert. That is, contrary to the eyelets that are crimped on one of the bridges and in mere support on the other, the inserts are embedded in each of the bridges, and they connect the bridges affixedly. The risk of the box collapsing is considerably reduced. The structure of the rim is stiffened by such linkages. It was already stiffened by the backflow chimneys. In addition, the flow drilling makes it possible to have, at the level of each bridge, a threading height that is much greater than the initial thickness of the wall of the bridge. In other words, a screwing linkage can be used here without significantly increasing the thickness of the wall. Furthermore, the length of the insert is not limited by manufacturing constraints, such that the distance which separates the two bridges of the rim is selected without any constraint relative to the length of the insert. The shape of the lower bridge can also be selectively more streamlined, for example, because the insert is no longer crimped but screwed within rim.

Figure 10:
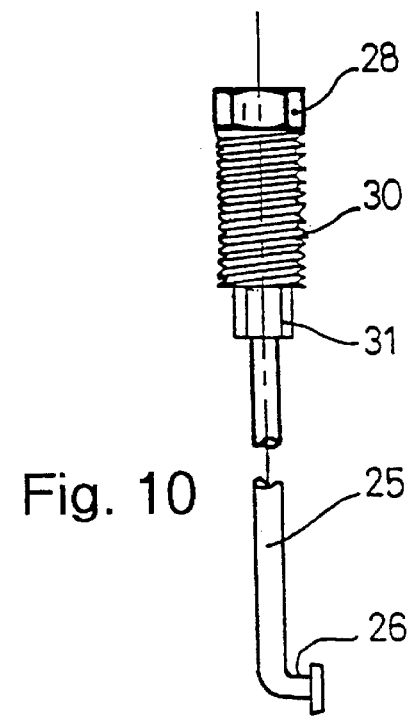
FIG. 10 is a side view of a spoke provided to be assembled to the insert.
Figure 11:
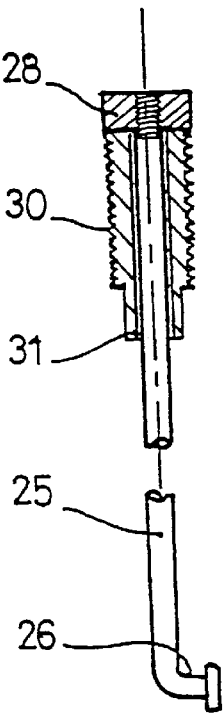
FIG. 11 is a view similar to FIG. 10 where the elements located at the end of the spoke are shown in cross section.

A spoke provided to be fastened to the rim by screwing in the insert is shown in FIGS. 10 and 11.

The spoke 25 shown is a wire with a bent head 26 that is provided to be hooked to a lateral flange of a hub, by force fitting in one of the openings of the flange. Of course, this is not limiting, and the spoke could also have a strait head, i.e, with no bend, and could be assembled by any technique other than force fitting, for example, by a mere engagement of the head in a buttonhole-shaped housing, or in a cutout. The median portion of the spoke has any section, in particular, it can be cylindrical or have an aerodynamic profile. The spokes could also be replaced by sticks assembled to the hub or integral therewith, the portion of the spokes which will now be described constituting the end portion of such sticks.

The spokes could also be formed from composite fibers.

This end portion includes a joining piece 28 that is affixed to the end of the spoke by any appropriate means, for example, screwing or adhesion on the threaded end of the spoke. The tip could also be assembled by welding, by caulking the end of the spoke, or it could be obtained by die forging the end of the same spoke. According to the mode of assembling the head of the spoke to the hub, especially by force fitting or by engagement into a slit, the joining piece is assembled after or prior to the operation of positioning the spoke on the hub.

The joining piece 28 has a polygonal section, for example hexagonal, which corresponds to the internal section of the insert. The joining piece is provided to engage and slide within the insert 18. The fact that the insert has an internal hexagonal section facilitates the positioning of the spoke, even before its tightening.

The cooperation between the hexagonal sections of the joining piece of the spoke and of the insert has the effect of retaining the end of the spoke in rotation, i.e., this prevents any twisting of the spoke. As has been said previously regarding the hexagonal section of the insert, any other appropriate means performing this function is suited.

At the rear of the joining piece, the end of the spoke carries a tension adjusting screw 30 which is traversed by the spoke and is mounted to rotate freely at its end. The screw is provided to abut against the joining piece 28 and to exert thereon a thrust that induces a tension in the spoke by reaction. The screw 30 is also provided to be tightened within the insert 18, thereby inducing a translation of the joining piece 28 within the insert.

Preferably, as is shown in FIGS. 10 and 11, the tension adjusting screw is extended on the side opposite the joining piece by a coupling sleeve with the tightening tool, such a sleeve 31 having a hexagonal section, for example. Any other appropriate means is also suitable.

Figure 12:
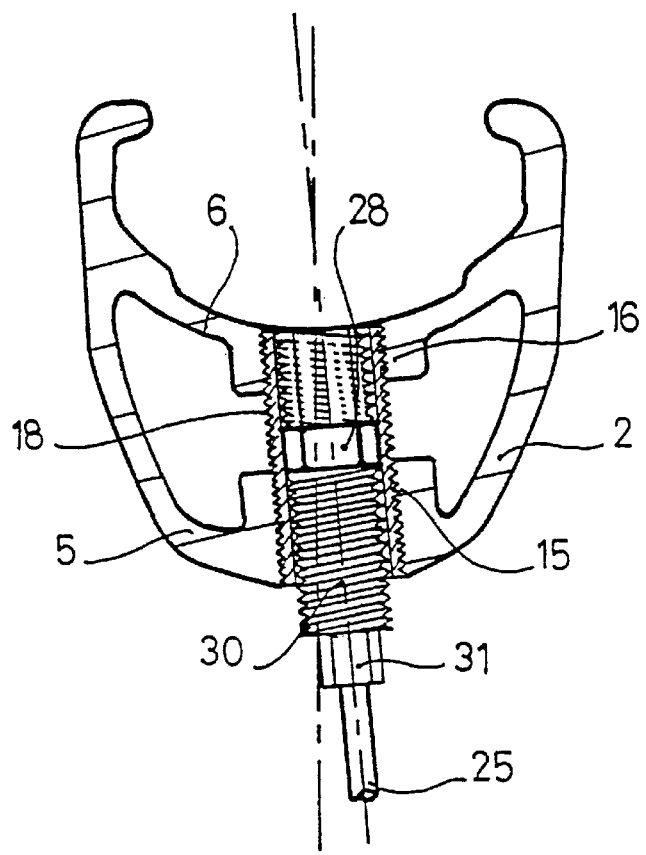
FIG. 12 shows the spoke assembled to the rim.

FIG. 12 schematically shows the rim in a plane of section including the insert.

This FIG. shows the various elements, in particular the insert 18 engaged in the two openings of the bridges 5 and 6 of the rim, the joining piece 28 slidably engaged in the insert, and the tension adjusting screw 30 partially screwed in the insert, with the coupling sleeve 31 accessible on the outside of the rim and which makes it possible to adjust the tension of the spoke. It must be noted that when adjusting the tension, the spoke only works in stretching since the joining piece 28 prevents the end of the spoke from pivoting. The spokes work in better conditions and the tension adjustment is thereby more accurate.

The construction that has just been described can be carried out with numerous variations. For the linkage between the rim and the insert, it would be possible, for example, to use a drill bit which provides the threading of at least one of the openings during the same operation. One could also use self-threading inserts, i.e, which create their own threading when they are screwed. Another variation would consists of threading only one opening, for example the opening of the lower bridge, and of ensuring the linkage with the other bridge by means of a self-threading section of the insert. According to another variation, the two openings could be bored by a single oriented drill bit operating on the upper bridge, and then on the lower bridge. Such a boring would have the effect of orienting the chimney of the lower bridge toward the outside of the box. According to another variation, the two openings could have different diameters, the insert having in this case a shoulder on which it can rest to ensure its tightening in the openings. One could also use a blind insert on the side of the upper bridge.

Figure 13:
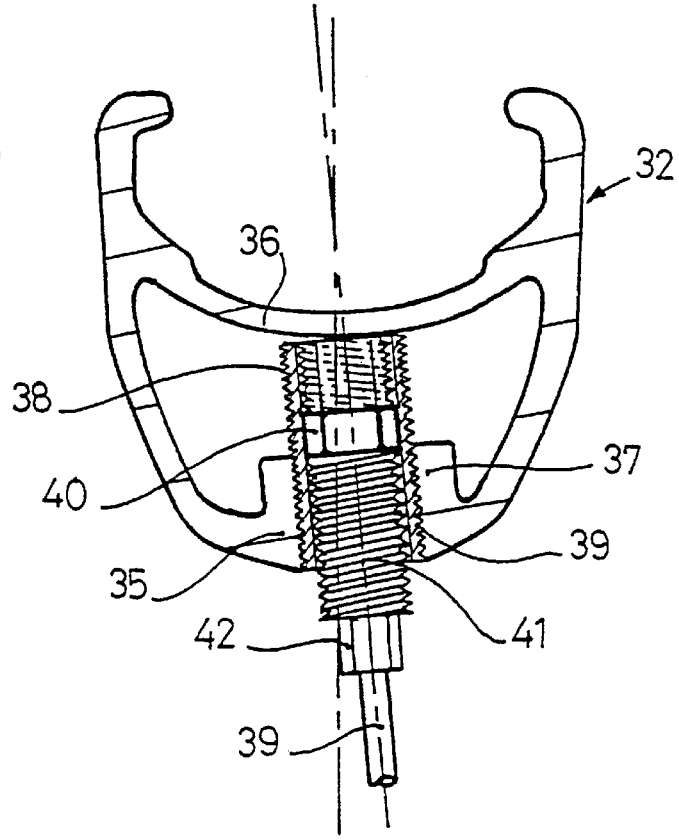
FIG. 13 is a view similar to FIG. 12 and illustrates another embodiment of the invention.

In this regard, FIG. 13 shows another embodiment of the invention. According to this embodiment, only the lower bridge 35 of the rim 32 is bored according to the flow drilling technique, so as to create a chimney 37. The upper bridge 36 is not bored in alignment with the chimneys of the lower bridge, it remains in the raw state. As is in the preceding case, the chimney 37 is threaded and an insert 38 is engaged by screwing in the chimney 37, and is tightened against the upper bridge. The insert 38, as the insert 18, has an internal wall threaded and machined along a hexagonal section. Such a construction is particularly well suited for making a tubeless wheel. Indeed, except for the hole provided for the valve, the upper bridge has no openings, and is therefore airtight.

The spoke 39 provided to cooperate with the insert 38 is quite similar to the preceding spoke, having at its end a joining piece 40 with a hexagonal section, a tension adjusting screw 41 extended by a coupling sleeve with a tightening tool.

Such a construction has the advantage that the rim is impervious, i.e., on the side of the tire, it has a continuous bridge that is unpunched, except for the mounting of the valve, if necessary. Such a rim is appropriate for the mounting of a tubeless type of tire, or a mounting where only a portion of the volume defined by the tire is occupied by a tube or a filling material, the other portion being occupied by pressurized air injected between the rim and the tire.

This other embodiment of the invention can also have alternatives of the same type as those that have been described previously.

Figure 14:
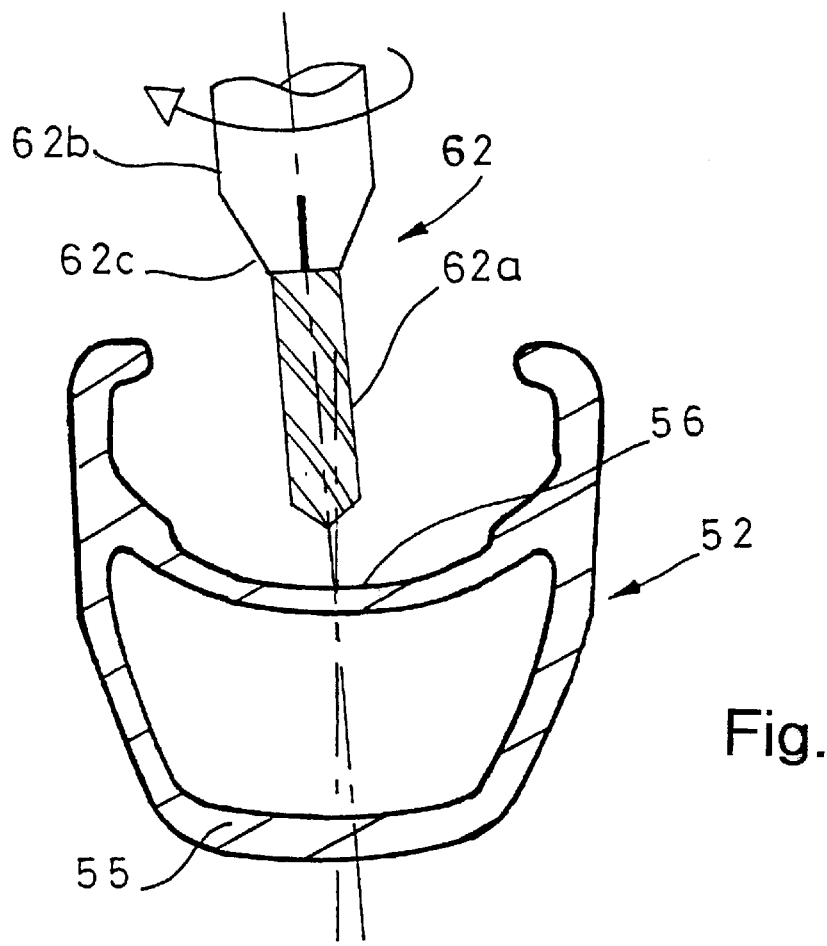
FIG. 14 illustrates the operation of boring the rim according to a further embodiment of the invention.

FIG. 14 illustrates the drilling operation according to a further embodiment. According to the embodiment shown, the rim is bored by means of a double staged drill bit 62. The drill bit is provided to drill the rim from the outside. The lower stage 62a is a conventional cutting drill bit of small diameter. This stage 62a is provided to drill a lead hole in the upper bridge 56, and then to drill in the lower bridge 55 an opening 64 provided for the passage of the spoke nipple. The diameter of the stage 62a is provided as a function of the external diameter of the spoke nipple.

The other stage 62b with a greater diameter operates by backflow. It has a prismatic head 62c whose tip is continuously extended by the cutting stage 62a. The body of the stage 62b that is set back with respect to the head 62c is cylindrical. Any other appropriate shape of the drill bit could also be suited.

Figure 15:
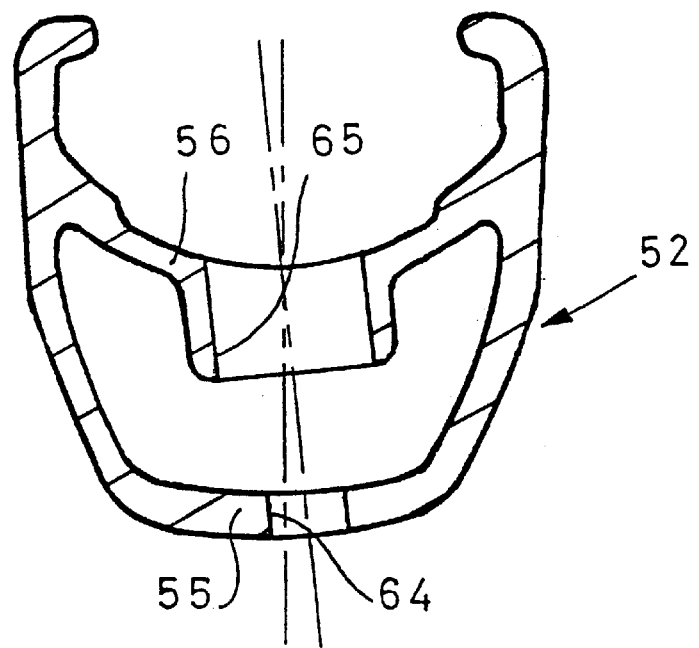
FIG. 15 shows the result of the boring operation.

FIG. 15 shows the rim bored by the drill bit 62. The lower bridge 55 has an opening 64 bored by the cutting stage 62a. The upper bridge 56 has a chimney 65 whose wall is oriented toward the inside of the box of the rim. If necessary, the external surface of the upper bridge 56 is trimmed off at the edges of the chimney 65. This step can be carried out with the drilling operation, or thereafter, during a separate operation.

Such a chimney preserves a certain continuity of the material on the edges of the opening. The structure of the bridge is only slightly modified due to this continuity, at any event much less than with conventional drilling. Therefore, the resistance of the bored rim is improved with respect to a conventional rim.

The chimney is also advantageous because it offers a useful height that is greater than the thickness of the wall of the bridge. This height can be twice, even three times greater than the thickness of the wall of the bridge. For a rim made of aluminum 6106, bored with a 5.5 mm drill bit, we have obtained a chimney useful height close to 5 millimeters on a bridge having a thickness of 1.5 mm. According to the invention, this substantial useful height is used to ensure the guiding and fastening of an insert provided to serve as a seat for a spoke nipple.

The drilling mode described is not limiting, and the two openings, opening 64 and the opening of the chimney 65, could be drilled during of two distinct operations, by means of two distinct drill bits. Under these conditions, the drill bit which drills the upper bridge would no longer have a cutting stage, but only a backflow stage.

Figure 16:
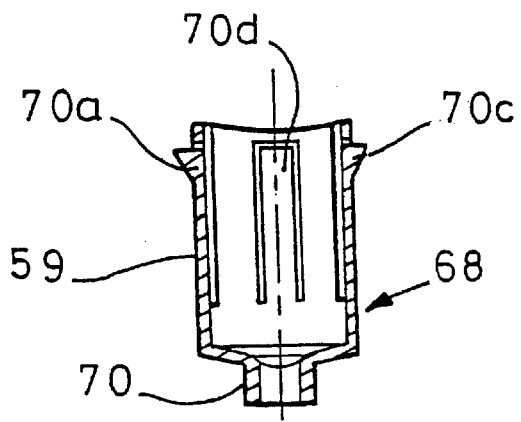
FIG. 16 is a front view of an insert provided to equip the rim.
Figure 17:
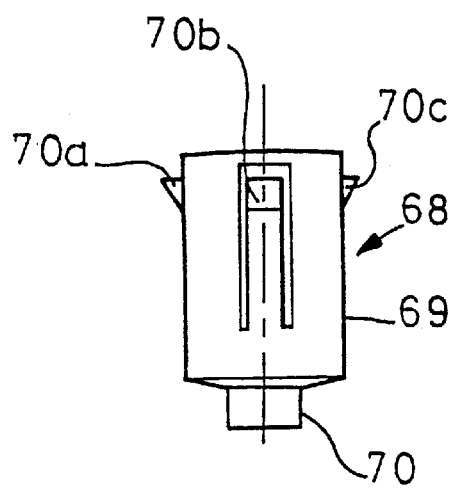
FIG. 17 a is cross sectional view of the insert of FIG. 16.

FIG. 16 shows a first embodiment of an insert 68 which is provided to equip the rim 52. Overall, the insert has a generally cylindrical body 69, extended downwardly by a centering neck 70.

Figure 18:
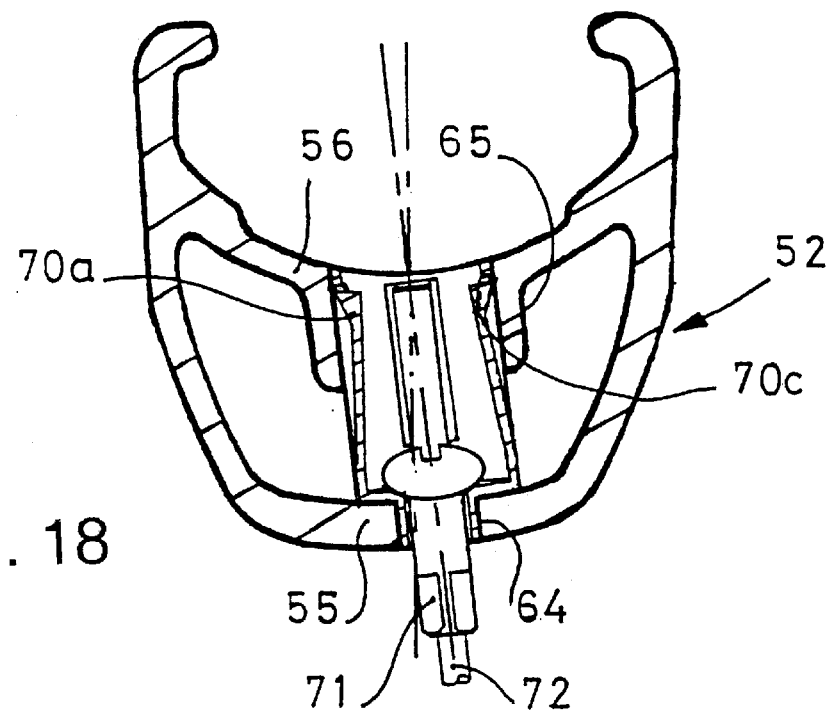
FIG. 18 is a sectional view of the rim at the level of an insert.

On the inside, the insert 68 has a housing provided to receive the nipple 71 of a spoke. Only the end 72 of the spoke is shown in FIG. 18. In a known manner, the spoke nipple has a button-head, and it is extended downwardly by a nipple body. Also in a known manner, the nipple body has a zone 73 with a square cavity or of any other appropriate shape for the coupling of a tightening tool.

The base of the insert 68 is provided to serve as a seat for the head of the spoke nipple and to be traversed by the nipple body. Preferably, there is a slight angular play between the base of the insert and the nipple, such that the nipple orients itself in the extension of the spoke, when it is tensioned.

The body 69 of the inset is provided to be introduced in the chimney 65. It has an external diameter that is substantially equal to the internal diameter of the chimney. At its base, the insert 68 has a centering neck 70. The neck is provided to penetrate into the opening 64 of the lower bridge. To this end, it has an external diameter substantially equal to the diameter of the opening 64, and a height close to the thickness of the bridge 55 at this level.

The height of the body 69 is equal to, or substantially less than the distance between the two bridges, such that when the insert is in support against the lower bridge, its upper portion is guided in the chimney 65, as shown in FIG. 18.

In the embodiment illustrated, the insert has, in its upper portion, a plurality of claws 70a, 70b, 70c, 70d, which are provided to penetrate into the wall of the chimney 65, thus ensuring that the insert is maintained in place in the absence of the spoke.

The claws are for example obtained from tongues that are cut into the wall of the insert and curved outward. The free end of the tongues is oriented toward the upper portion of the insert to enable engagement of the insert in the chimney and to retain it in the opposite direction.

While reinforcing the rigidity of the upper bridge, the chimney 65 here facilitates the positioning of the inserts, because its ensures the guiding of the insert body until the centering neck is engaged in the opening 64. In addition, the internal wall of the chimney offers a relatively large surface to carry out the fastening of the insert. In other words, it is possible to have tolerances of relatively substantial dimensions over the distance between the two bridges, or along the height of the insert without compromising the positioning of the various elements.

The insert is made of any appropriate material, for example, a material known by the commercial name "ZAMAC", or any other appropriate material. The base which serves as a seat for the spoke nipple and the upper portion of the body which ensures the guiding and fastening of the insert can also be made of different materials.

This advantageously makes it possible to determine the distance between the two bridges, independently of the constraints that are imposed on the manufacturing of the conventional eyelets. In addition, provided that it allows for the drilling and positioning of the chimney 65, the upper bridge can be defined with any width and shape. The lower bridge could also have a shape other than that shown, for example, a V-shaped section.

In addition, the insert could be fastened in the chimney in any of various ways, and could be embodied, in particular, by a punching operation, or the like, during which the fastening device would be embedded in the wall of the chimney 65.

Figure 19:
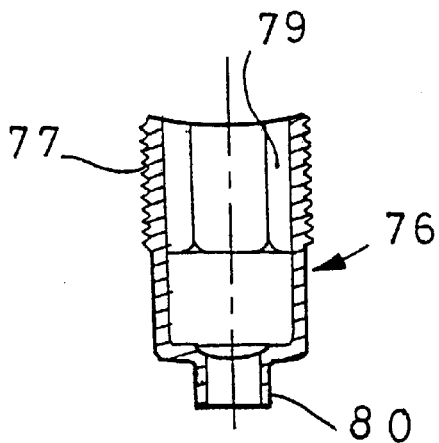
FIG. 19 shows a front view of an insert according to an alternative embodiment.
Figure 20:
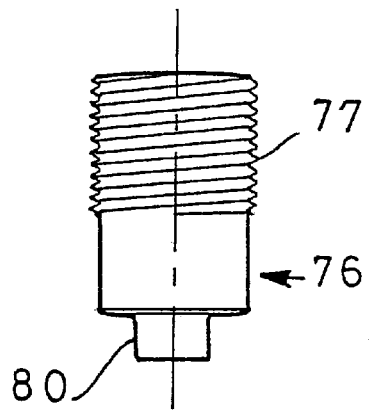
FIG. 20 is a cross sectional view of the insert of FIG. 19.
Figure 21:
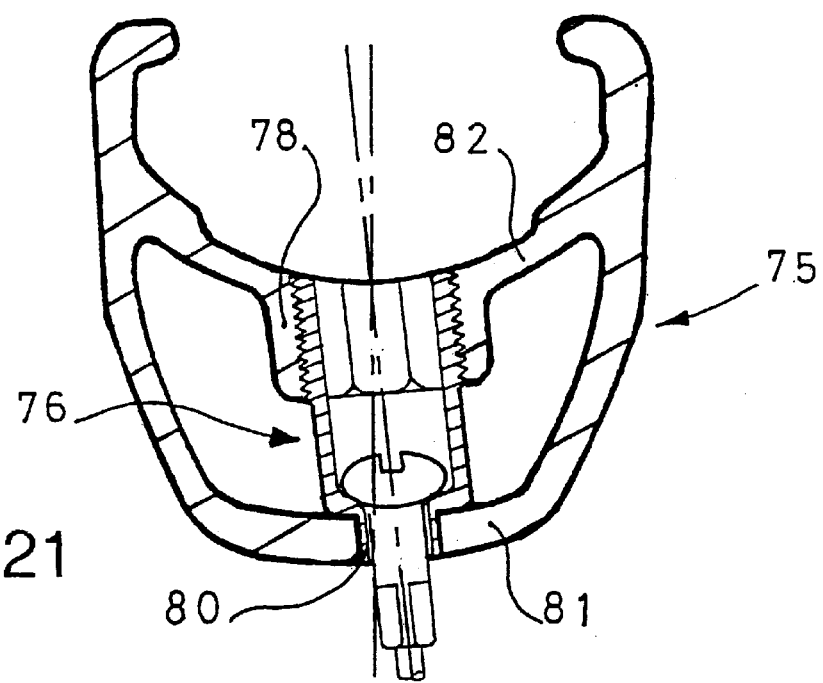
FIG. 21 is a sectional view of the rim in the area of an insert.

FIGS. 19–21 illustrate an alternative embodiment of the invention. According to this alternative embodiment, the insert is not engaged and locked in the chimney, but is screwed. The rim 75 generally has a structure that is similar to the preceding rim. In particular, it has an upper bridge equipped with openings bored by flow drilling in order to create a chimney, and a lower bridge bored with openings in the alignment of the chimneys.

FIGS. 19 and 20 show an insert 76 of the same type as the insert 68, except that the upper portion of its body has a thread 77 that is provided to cooperate with an internal thread of the chimney 78. The thread 77 is provided to be screwed in a threaded chimney during a tapping operation. It also can be self-threading, i.e., can create its own thread in the chimney 78. In its upper portion, the insert 76 shown in the FIGS. has a hexagonal cavity 79 provided to ensure the coupling with an appropriate tightening tool, especially an ALLEN wrench. Any other appropriate means is suited. During tightening, the supported insert is in abutment against the lower bridge 81. Eventually, any appropriate means, such as adhesive, can be used to avoid any accidental loosening.

As in the preceding case, the insert has a centering neck 80 in its lower portion. However, this neck is not indispensable, and the insert could rest directly on the lower bridge.

As in the preceding embodiment, the chimneys 78 reinforce the structure of the upper bridge because they preserve the continuity of the structure on the edges of the openings. The advantage of this construction mode is that the insert establishes a mechanical connection between the two bridges in the same manner as a conventional double eyelet. Indeed, the insert transmits the tension of the spoke to both the lower bridge 81 and the upper bridge 82, as well as the variation in this tension, if necessary. In addition, the thread provides a guide that facilitates the positioning of the insert.

Although the invention is been described with reference to particular means, materials, and embodiments, it is to be understood that the invention is not limited to the particulars expressly disclosed, but that the invention extends to all equivalents within the scope of the claims that follow.

This application is based upon French Patent Application No. 96 09047, filed on Jul. 12, 1996, and upon French Patent Application No. 96 09048, filed on Jul. 12, 1996, the disclosures of which is hereby expressly incorporated by reference thereto in their entirety and the priority of which are claimed under 35 USC § 119.

What is claimed is:

1. A method for making a one-piece bicycle rim bored with openings provided to receive tension spokes for linking with a hub, the one-piece rim having a box with an upper bridge and a lower bridge, said bridges being connected by lateral walls, said walls extending beyond said upper bridge with wings forming with said upper bridge an annular channel to receive a tire, said method comprising:

boring at least one of said bridges with at least one through hole by means of a flow drilling drill bit to define an elongated tubular chimney.

2. The method according to claim 1, further comprising boring said one of said bridges with a through hole by means of a flow drilling drill bit operating in the direction of the other of said bridges.

3. The method according to claim 1, further comprising threading at least one through hole of said one of said bridges bored by means of a flow drilling drill bit.

4. The method according to claim 1, wherein only one of said bridges is bored by means of a flow drilling drill bit operation.

5. The method according to claim 4, wherein said one of said bridges is said lower bridge and the other of said bridges is not bored.

6. The method according to claim 3, wherein said lower bridge is bored with a plurality of threaded through holes and said upper bridge is not bored in alignment with said threaded through holes of said lower bridge.

7. The method according to claim 6, further comprising screwing a threaded insert in each of said plurality of threaded through holes of said lower bridge.

8. The method according to claim 1, wherein said at least one of said bridges is said lower bridge, and further comprising boring the other of said bridges with through holes by means of a flow drilling drill bit operation.

9. The method according to claim 8, wherein both of said bridges are bored with through holes oriented in a direction toward one another and in alignment with one another.

10. The method according to claim 9, wherein said holes of both of said bridges bored in alignment with one another have a same diameter.

11. The method according to claim 10, further comprising threading said holes of both of said bridges bored in alignment with one another.

12. The method according to claim 11, further comprising screwing an insert into both through holes of said upper bridge and said lower bridge bored in alignment with one another.

13. The method according to claim 4, wherein said only one of said bridges is said upper bridge.

14. The method according to claim 13, further comprising boring said lower bridge in alignment with said through hole of said upper bridge with a lead hole by means of a cutting drill bit.

15. The method according to claim 14, where in said lead hole of said lower bridge has a smaller diameter than said through hole of said upper bridge.

16. The method according to claim 15, further comprising boring said through hole of said upper bridge and said lead hole of said lower bridge in alignment with one another with a same drill bit.

17. The method according to claim 16, said drill bit has a lower stage provided with a conventional cutting drill bit.

18. The method according to claim 15, further comprising boring said through hole of said upper bridge with a first drill bit, and boring said lead hole of said lower bridge with a second drill bit and in alignment with the through hole in said upper bridge.

19. The method according to claim 15, further comprising introducing an insert in the through hole of said upper bridge.

20. The method according to claim 15, further comprising threading said through hole of said upper bridge.

21. The method according to claim 20, further comprising screwing an insert in said threaded through hole of said upper bridge.

22. The method according to claim 21, further comprising screwing said insert into abutment against said lower bridge.

23. The method according to claim 1, further comprising forming the chimney with internal threads extending therealong a distance greater than the thickness of said lower bridge, thereby providing a greater threaded length for engagement by threaded tension spokes than would be provided by threading said lower bridge alone which results in a greater holding ability.

* * * * *